R. C. THOMAS.
WATER METER.
APPLICATION FILED MAR. 1, 1915.
1,160,465.
Patented Nov. 16, 1915.
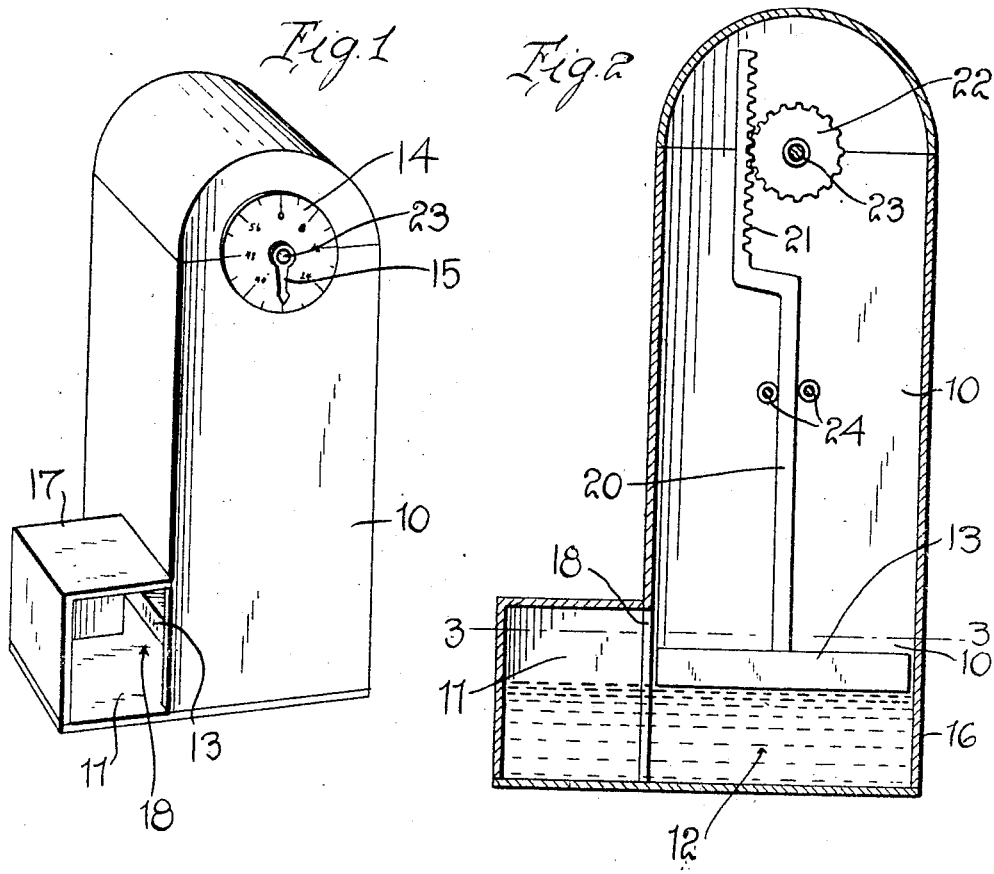
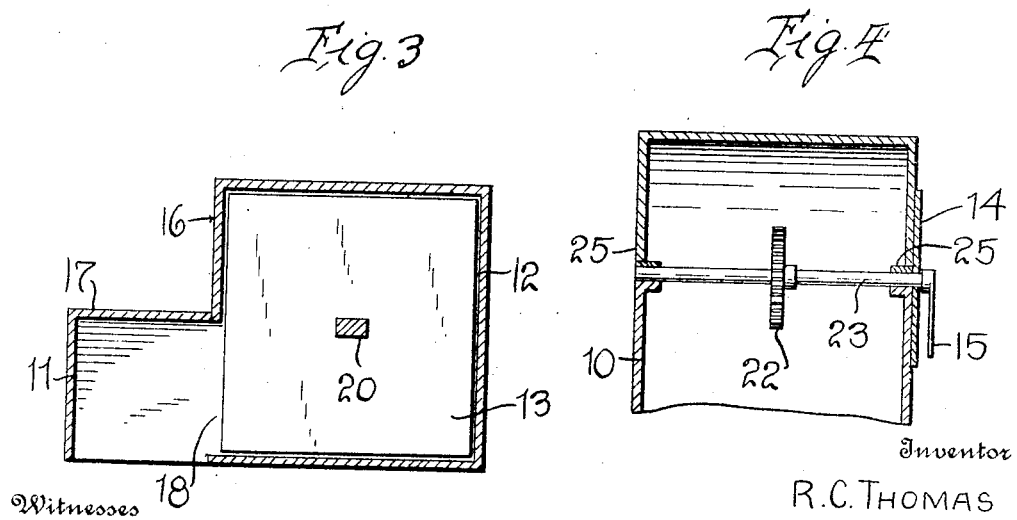
Witnesses
Robert M. Sutphen.
A. J. Hind.
Inventor
R. C. Thomas
By Watson E. Coleman
Attorney

UNITED STATES PATENT OFFICE.

ROGER C. THOMAS, OF GOODING, IDAHO.

WATER-METER.

1,160,465.   Specification of Letters Patent.   Patented Nov. 16, 1915.

Application filed March 1, 1915. Serial No. 11,280.

*To all whom it may concern:*

Be it known that I, ROGER C. THOMAS, a citizen of the United States, residing at Gooding, in the county of Gooding and State of Idaho, have invented certain new and useful Improvements in Water-Meters, of which the following is a specification, reference being had to the accompanying drawings.

My present invention relates broadly to new and useful improvements in water meters and as its principal object aims to provide a simple and compact device of this character which may be efficiently employed in determining the volume of water contained in an irrigation ditch, canal, or similar artificial body of water in which the dimensions of the ditch or the like are foreknown.

A further object is to provide a water meter of the character specified which is relatively simple in construction, may be cheaply manufactured, will be durable and efficient in service and may be easily and conveniently installed at the side of a ditch, in an out-of-the way position, so as not to interfere with the free flow of water therethrough.

A more specific object is to construct a water meter which consists essentially of an indicator dial bearing indicia representing miner's inches, a dial hand, and a float controlled mechanism for moving the dial hand in accordance with variations in the water level of the ditch.

The above and additional objects are accomplished by such means as are illustrated in the accompanying drawings, described in the following specification, and then more particularly pointed out in the claims which are appended hereto and form a part of this application.

With reference to the drawings, wherein there has been illustrated the preferred embodiment of this invention, as it is reduced to practice, and throughout the several views of which similar reference numerals designate corresponding parts, Figure 1 is a perspective view of the meter. Fig. 2 is a vertical section taken medially through the meter. Fig. 3 is a section on the line 3—3, Fig. 2; and Fig. 4 is a detail section taken through the upper portion of the meter in a plane at right angles to the plane of the section shown in Fig. 2.

In the embodiment shown in the accompanying drawings, the meter includes as its essential elements, a body casing 10, an inlet chamber 11, a float chamber 12, a float 13, a dial 14 and an operating mechanism connecting the float and a dial hand 15.

The body casing 10 is preferably, although not necessarily, rectangular in shape, being formed of wood, metal or some material which may be found impervious to the action of water.

The float chamber 12 is defined by a box-like casing 16 which forms a continuation of the lower end of the body casing 10 and serves as a supporting base therefor.

The inlet chamber 11 is defined by a box or casing 17, the one wall of which is removed to provide the inlet opening shown best in Fig. 3. This inlet opening is arranged, when the meter is installed, so as to receive the water from the irrigation ditch, canal or other artificial body of water with which the meter is employed. The water entering the inlet box is adapted to pass into the float chamber 12, through the opening 18 formed in one wall thereof.

Within the float chamber is arranged the float 13 which, in shape, corresponds to the perimeter of the float chamber, being of slightly smaller dimensions, however, so that it may freely move in the member 12. The float 13 may consist of cork, wood or, if desired, a hollow air-tight metallic casing. Rising from the float is the dial hand operating rod 20, the upper terminal of which is provided with rack teeth 21. These rack teeth are designed to mesh at all times with the teeth of the pinion 22 which is keyed on the shaft 23. Guides indicated at 24 are provided for the operating rod so that the teeth thereof will be held against disengagement with the teeth of the pinion. The shaft 23 is terminally journaled in half bearings 25 and is supported from the upper ends of the side walls of the casing 10. To the one terminal of the shaft is keyed the dial hand 15. The dial 14 is secured to the outer face of the casing of the side wall in any desired manner and is arranged concentrically with respect to the shaft 23.

Mounted upon the face of the dial appear indicia shown in Fig. 1. These indicia represent miner's inches and are spaced from each other such a distance that the dial hand will indicate an increase of one miner's inch for every increase of a one-fourth inch or other predetermined unit, in the level of the water in the ditch. It will, of course, be appreciated that the figures on the dial are positioned in accordance with the known dimensions of the ditch, or canal to which the meter is applied.

From the foregoing description it will now be apparent that the inlet box constitutes a means for insuring the presence of still water in the float chamber at all times so that only steady rises in water level will be communicated to the float. Obviously, the upward or downward movement of the float will cause a rotation of the shaft 23 and, consequently the movement of the dial hand, through the medium of the pinion 22.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that minor changes in details of construction, proportion and arrangement of parts may be resorted to, when required, without sacrificing any of the advantages of this invention, as defined in the appended claims.

What is claimed is:—

1. A water meter of the character described including a body casing, a float box, an inlet box communicating with the float box, a float movable in the float box, a dial carried by the body casing, a dial hand, and means operatively connecting the float and dial hand.

2. A water meter of the character described including a body casing, a float box, an inlet box communicating therewith and horizontally offset with respect to the body casing, a float movable in the float box, a dial, a dial hand, and means operatively connecting the float and dial hand.

In testimony whereof I hereunto affix my signature in the presence of two witnesses.

ROGER C. THOMAS.

Witnesses:
P. T. SUTPHEN,
D. H. SUTPHEN.

Copies of this patent may be obtained for five cents each, by addressing the "Commissioner of Patents, Washington, D. C."